May 17, 1927. 1,628,769

R. Z. FARMER

AUTOMATIC VARIABLE SPEED TRANSMISSION APPARATUS

Filed June 11, 1925    3 Sheets-Sheet 1

Inventor:
Robert Z. Farmer,
By his
Attorney,
Horace Barnes.

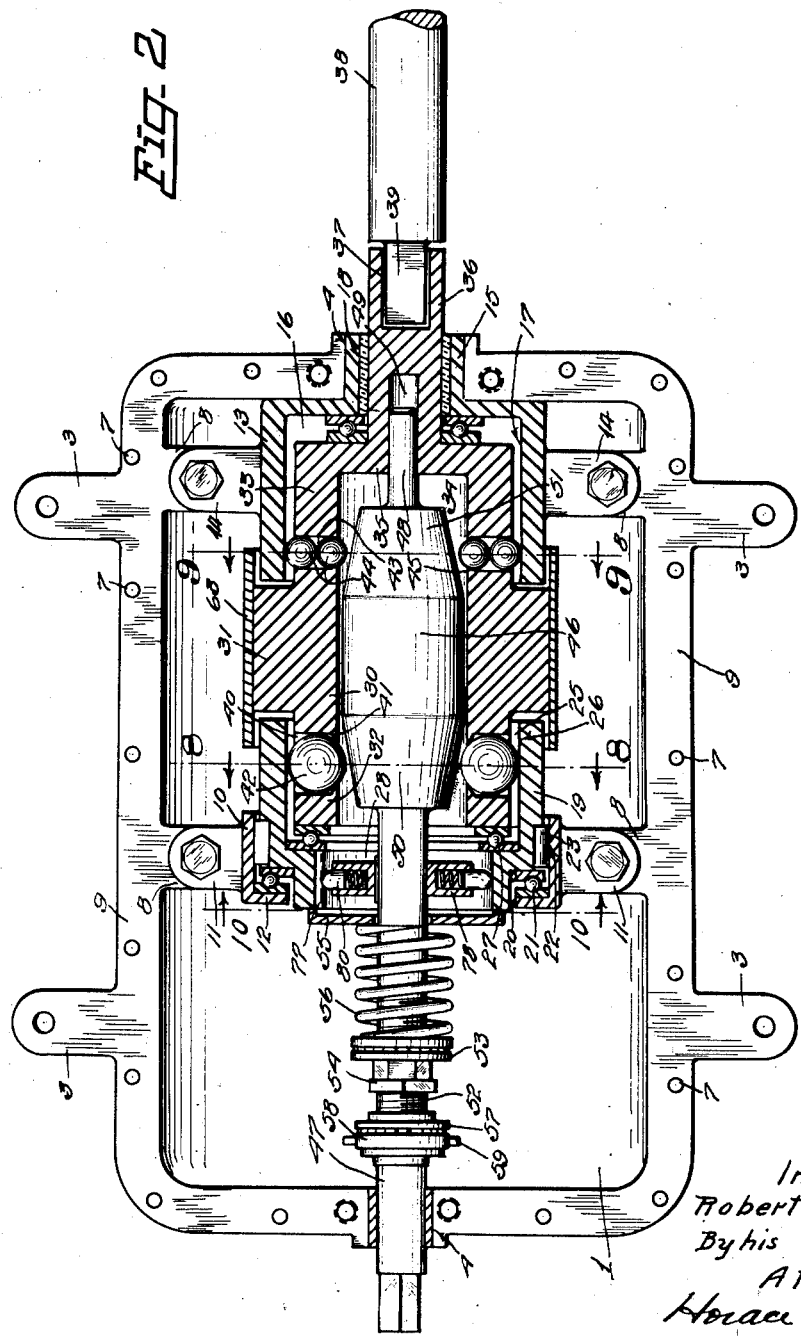

May 17, 1927. 1,628,769
R. Z. FARMER
AUTOMATIC VARIABLE SPEED TRANSMISSION APPARATUS
Filed June 11, 1925 3 Sheets-Sheet 3

Inventor,
Robert Z. Farmer,
By his Attorney,
Horace Barnes.

Patented May 17, 1927.

1,628,769

UNITED STATES PATENT OFFICE.

ROBERT Z. FARMER, OF PORTLAND, OREGON.

AUTOMATIC VARIABLE-SPEED TRANSMISSION APPARATUS.

Application filed June 11, 1925. Serial No. 36,339.

This invention relates to improvements in automatic variable speed transmission apparatus, and particularly to that type of apparatus described in the prior patent application filed in the Patent Office jointly by myself and Theodore Gensmer on December 24, 1924, Serial No. 757,784.

The object of the present invention is the provision of simplified apparatus having relatively few parts and of compact arrangement and design for transmitting the full power from the motor to the drive wheels of an automobile and which may be accomplished with automatically operating changes in relative speeds of drive-wheels and motor.

A further object of the present invention is the provision of novel apparatus having definitely predetermined high and low speeds relative to the governed speed of the engine and adapted to automatically change from higher to lower speeds and vice versa as the demands for power applied to the drive-wheels require.

A still further object of the invention is to provide novel devices for retarding the action of the apparatus in its changes from higher to lower speeds in order to extend the periods of time wherein the transmission will operate in the intermediate speeds.

Other objects and advantages of my invention and objects relating to details of construction and arrangement of operative parts will be readily apparent in the course of the detailed description to follow.

The accompanying drawings illustrate by way of example one form of my invention, in which:

Fig. 2 is a top plan view of the under section of the invention with the upper portion of the housing removed, certain operative parts being shown in horizontal section and in their neutral positions.

Figure 1:
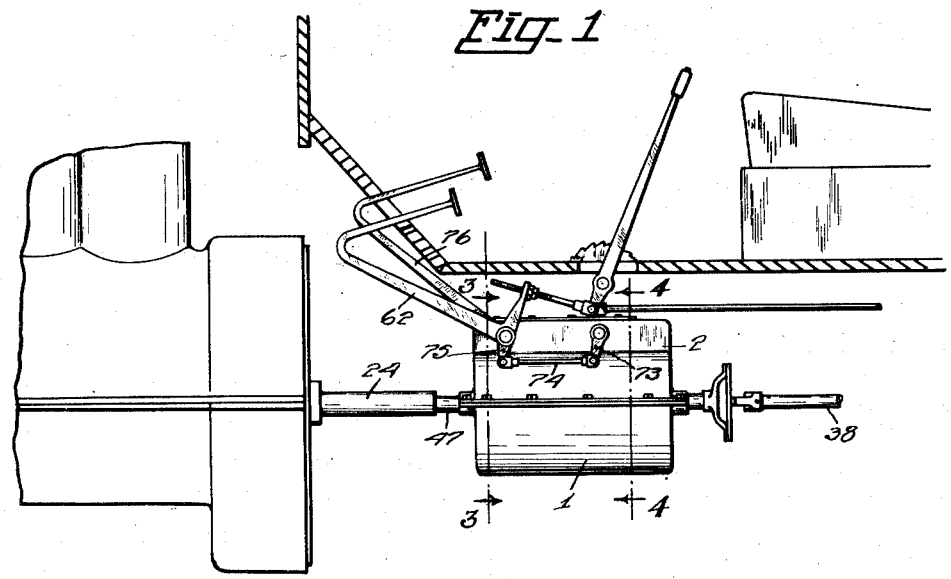
Figure 1 is a view in side elevation of apparatus embodying my invention shown mounted in an automobile which is partially indicated.
Figure 7:
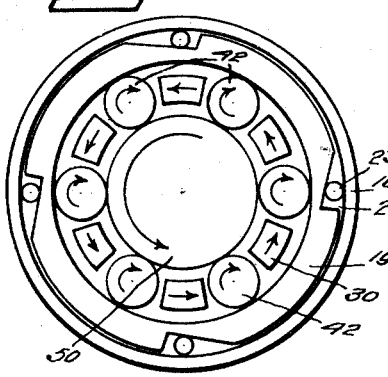
Fig. 7 is a diagrammatic sectional view taken substantially on line 7—7 of Fig. 2, illustrating one of the operative conditions of the apparatus.
Figure 8:
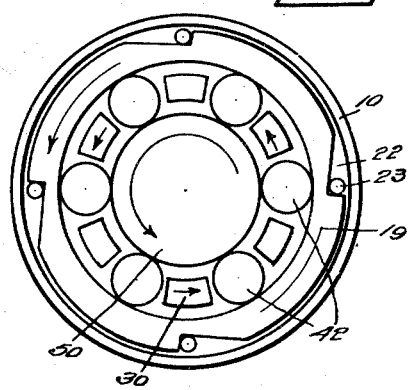
Fig. 8 is a view similar to Fig. 7 illustrating another operative condition of the apparatus.
Figure 9:
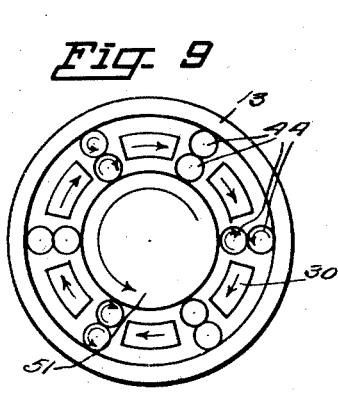
Fig. 9 is a diagrammatic view taken on line 9—9 of Fig. 2 illustrating the operation of the reversing mechanism.
Figure 10:
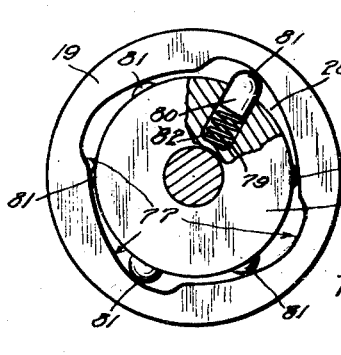
Fig. 10 is a view in cross section on line 10—10 of Fig. 2, parts being broken away.

Referring to said views, the reference numeral 1 indicates the lower half-section of the external housing of my improved variable speed transmission apparatus, and 2 the upper half-section thereof. Said lower section is formed with laterally directed lugs 3 by which it is rigidly secured to the frame of an automobile chassis. The housing is formed in bi-lateral symmetry and its longitudinal axis is in line with the similar axis of the car. Said housing is formed with bearing apertures 4 at each end, one-half of each said aperture being formed in each half-section. The sections are rigidly clamped together through bolt-holes 7.

The lower section of said housing is formed with pairs of lugs 8 at each side extending inwardly in substantially the plane of its marginal flange 9. An annular bearing-strap 10 is rigidly connected to the forward of said pairs of lugs 8 by lugs 11 and is formed with an inturned marginal flange 12.

A cylindrical casing 13 is rigidly connected by lugs 14 with the rearmost of said lugs 8 and is formed with a collar 15 extending into the rear of the apertures 4. The casing is further formed with an internal chamber 16 having cylindrical side walls 17 and an axial bore 18 through said collar.

A cylinder 19 is rotatably mounted in the bearing-strap 10 and is formed with an annular recess 20 on its forward face between which and the flange 12 a thrust-bearing 21 is positioned. A clutch of the roller type is provided in the perimeter of the cylinder acting against the inner face of the strap 10 and consists in a plurality of spaced reentrant angular notches 22 about the forward periphery of the cylinder and having in each said notch a roller 23. Said notches are arranged and disposed so that the cylinder may rotate freely in the same rotary direction as the motor-crank shaft 24 but will be firmly locked by said clutch against rotation in a contrary direction.

Cylinder 19 is formed internally with an axially disposed chamber 25 having cylindrical side walls 26 and at the forward end thereof with a ledge upon which a thrust-bearing 27 is seated. Forwardly of said ledge an opening 28 is provided which will be more particularly described hereinafter.

Figure 5:
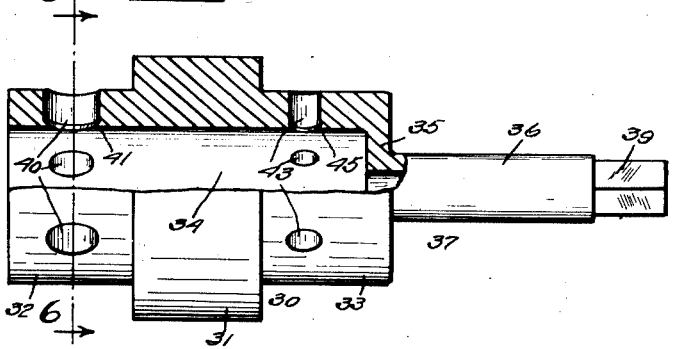
Fig. 5 is a detached view in side elevation of an element of the invention, shown partly in section.
Figure 6:
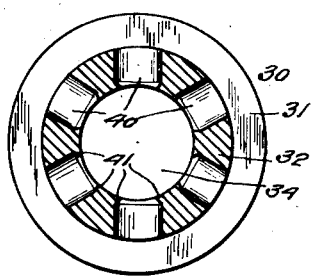
Fig. 6 is a view in cross section on line 6—6 of Fig. 5.

A frame 30, see Fig. 5, is formed with a cylindrical middle body portion 31 positioned between the casing 13 and the cylinder 19, a reduced cylindrical barrel 32 extending into the cylinder-chamber 25, and a similar barrel 33 extending into casing chamber 16. The frame is formed with an axially disposed cylindrical cell 34 having an open end facing forwardly and a rear wall 35. An integral shank 36 of the frame extends in the axis thereof rearwardly and is journaled for rotation in the rear bearing aperture 4. A squared recess 37 is formed in the rear end of said shank through which operative connection is made with the propeller-shaft 38 of the car by an interfitting squared tongue 39.

The barrel 32 is formed with a plurality of symmetrically positioned, radially directed circular pockets 40 bored therethrough from the exterior wall and having a circular ledge 41 upon their inner extremities. Said pockets are each arranged to receive a hardened steel ball 42 whose perimeter extends outwardly of the pocket beyond the inner and outer walls of said frame.

The rear barrel 33 is provided with a plurality of pockets 43 similar to the pockets 40 but smaller in diameter to each receive two balls 44 of smaller size in superposed relation. An annular ledge 45 is provided at the inner extremities of the pockets 43 upon which the inner of the balls 44 is lodged so that the perimeters of the latter extend inwardly into the cell 34 while the perimeters of the outer balls 44 extend outwardly of the pockets to engage the wall 17 of the casing.

A double-cone driving member 46 is slidably mounted in the cell 34 of the frame and is formed integral with a shank 47 journaled for rotation in the forward bearing 4 of the housing, and a rear stem 48 journaled in a recess 49 formed axially of the frame-shank 36. Forwardly of the housing the shank 47 is operatively connected by a joint admitting of sliding movements of the shank relative to the motor crank-shaft 24.

The forward cone-portion 50 of the member 46 is tapered toward the forward end of the car and the rear cone-portion 51 is tapered in the opposite direction. The cone-member 46 is shiftable with the shank 47 to operatively engage the cones 50 or 51 with the respective sets of balls 42 or 44, or to an intermediate position as shown in Fig. 2 where it is disengaged from all balls and is in a neutral position.

The shank 47 may be screw-threaded, as at 52, to receive a thrust-collar 53 additionally secured by a lock-nut 54. A plate 55 is positioned to bear upon the front face of the cylinder 19 masking the front opening 28 therein. Between the collar 53 and the plate 55 a coil-spring 56 is mounted on the shank 47 tending to urge the cone-member into its most forward position.

Figure 3:
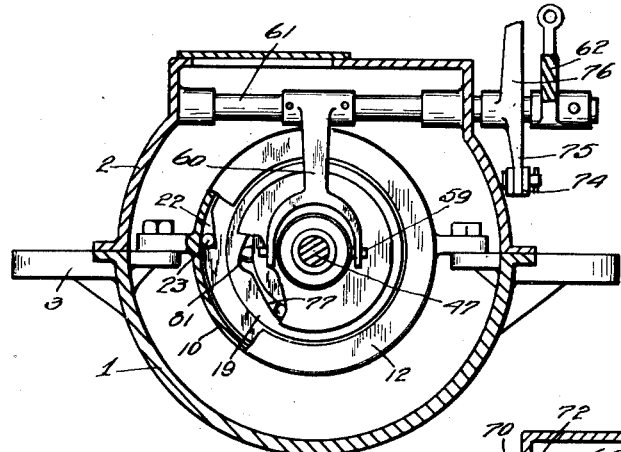
Fig. 3 is a view in cross section on line 3—3 of Fig. 1 upon an enlarged scale, parts being broken away.
Figure 4:
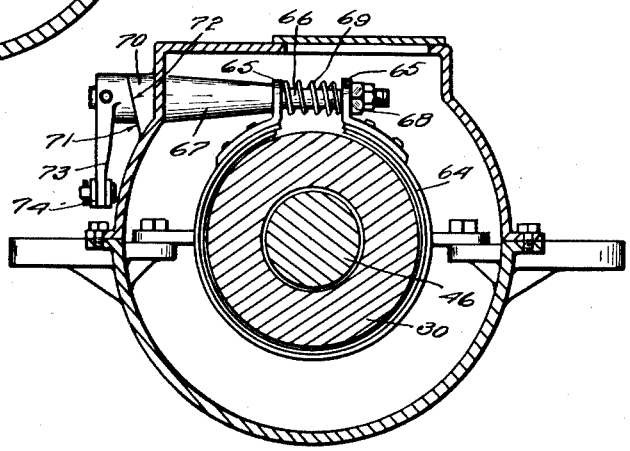
Fig. 4 is a view in cross section on line 4—4 of Fig. 1 upon an enlarged scale.

A collar 57 is keyed to the shank 47 forwardly of the collar 53 having an annular groove therein to receive a ring 58 provided with a horizontally projecting pin 59 upon each side to which a yoke-lever 60 is connected. The yoke-lever 60 is pinned to a rocking-arbor 61 journaled in the upper portion of the housing, see Fig. 3, and extends outwardly of the housing where an operating foot-controlled lever 62 is rigidly connected therewith.

Secured to the middle body-portion 31 of the frame is a brake-drum 63 extending at its lateral edges somewhat over the contiguous portions of the cylinder 19 and the casing 13. A brake-band 64 extends about said drum and is provided with slotted lugs 65 at each of its ends. A pin 66 is received within said lug-slots and is supported for oscillation in a boss 67 integral or rigidly mounted in the upper section 2 of the housing and is formed with a horizontally disposed bore therethrough. Said pin is screw-threaded at its inner end to receive nuts 68 engaging upon the outer side of one of the lugs 65 while the other lug bears against the boss 67. A coil-spring 69 upon said pin between the lugs 65 yieldingly presses the lugs against the boss and nuts to resiliently maintain the brake band in open inoperative position.

A boss 70 upon the outer side of the housing is in line with the boss 67 and is bored in register therewith through which the pin 66 extends. The boss 70 is formed with an inclined face 71 against which the inclined face 72 of a crank-arm 73 keyed to the pin 66 is opposed. A link 74 connects the crank-arm 73 with a crank-arm 75 loosely mounted on the rocking-arbor 61. A foot-controlled brake-lever 76 is integrally connected to the crank-arm 75 through which the lugs 65 may be drawn together and the band 64 contracted about the drum 63.

The opening 28 of the cylinder 19 is formed in its internal perimeter with a plurality of symmetrically arranged cam-faces 77. A disk 78 is keyed upon the shank 47 within said opening and is formed with a plurality of radially disposed sockets 79 at equal distances apart and in each of which is seated a plunger 80 having a hardened rounded head 81. Within each said socket and behind each plunger is a coil-spring 82 adapted to yielding urge the plungers outwardly against the cam-faces 77.

There are preferably a larger number of said plungers than cam-faces in order that in the rotation of the shank 47 and the disk 78 the respective plungers will be in frictional engagement upon relatively different parts of the various cam-faces and a practically constant amount of resistance and a smooth operation of the plungers will result during the rotation about the opening.

The operation of my invention may be described as follows: Referring to Fig. 2 wherein the apparatus is illustrated in its neutral position, it will be understood that the cone-member 46 is maintained in such position through the foot-lever 62 being held in a medial position by the operator or temporarily held therein by a detent, not shown, of an ordinary type.

The motor of the car being in motion, when it is desired to propel the car forwardly the foot-lever 62 is released from detention which admits of the spring 56 asserting itself to thrust the shank 47 forwardly and bring the forward cone 50 into contact with the balls 42. With the car at a standstill the force required to overcome its inertia will require that the apparatus will operate in the equivalent of low-gear speeds in the ordinary type of geared transmission, and will operate in the following manner.

The balls 42 being engaged with force between the cone 50 and the cylinder walls 26 will rotate upon the cone and bear at the opposite points of their peripheries upon said cylinder walls to rotate the cylinder in a direction reverse to that of the cone until the cylinder is almost immediately gripped by the over-running clutch-rollers 23 in the notches 22 holding the cylinder stationary as a bearing while the frame 30 is driven in the same rotary direction as the cone-member at a lower rate of speed and the frame being connected directly with the tail-shaft of the car the latter will be started in motion as driven by the lowermost speed of the car and at its maximum of power. This constitutes the low-gear of the apparatus and enables the maximum of power of the engine to be exerted with no appreciable loss through friction or slip.

Upon the car gaining momentum or the drag from the rear end being less upon the tail shaft in propelling the car relative to the power delivered by the engine in speed the rearward thrust of the balls upon the cylinder will be relatively less and the cylinder will take up more or less motion in the same direction as the cone whereupon the clutch-rollers will be released and the frame and the tail-shaft will rotate at a correspondingly greater rate of speed, approximately at a mean between the speeds of the cone and of the cylinder and in the same rotary direction. This comprises the intermediate speeds of the apparatus and is completely flexible to vary the speeds in accordance with the conditions under which the car is working through an infinity of speeds between the extreme low speed described and the high speed of the apparatus.

Upon the cylinder taking up the same rate of rotation as the cone-member, as it will under relatively light loads and under ordinary conditions when under way, the cone, the frame, and the cylinder will all rotate in unison and as a unit with the balls 42 at rest in their pockets. This is the high speed in the apparatus and is practically a direct drive to the rear axle.

The disk 78 and mechanism therein in conjunction with the cam-faces 77 tend to afford a certain amount of friction between the shank 47 and the cylinder whereby the cylinder is lightly constrained to follow the movements of the shank. By this means the tendency to drop from high speed to intermediate speeds by the lagging of the cylinder is retarded and the apparatus will remain somewhat longer in intermediate speeds before a reverse rotation of the cylinder causes the apparatus to drop into low speed.

Similarly, the movements from low speed into intermediate speeds will take place at an earlier period and will tend to advance the speed into high at a faster rate while when the apparatus is in high speed it will tend to remain there longer due to the friction developed through the disk mechanism upon the relative movement of the cylinder. During high speeds there is no change in the position of the disk mechanism.

To reverse the car the cone-member 46 is pressed rearwardly by the foot lever 62 to bring the rear cone 51 into engagement with the inner of balls 44 which being in contact with the outer ones of said balls that are in engagement with the stationary casing 13 causes the frame 30 to rotate in a rever e direction to the cone and to that heretofore described and at a rate of speed and at an equivalent amount of power to the low-speed state of the forwardly operating devices.

Having described my invention, what I claim, is :—

1. Variable speed transmission apparatus, consisting in a housing, an annular bearing-strap rigidly mounted interiorly of said housing, a cylinder rotatively journaled in said bearing-strap having an interior, axially cylindrical chamber therein, a fixed casing mounted in axial alignment with said cylinder formed with an interior, axially cylindrical chamber oppositely disposed to said cylinder-chamber, a clutch-device associated with said cylinder and engageable with said bearing-strap to prevent reverse rotation of the cylinder, a rotatable frame mounted in said chambers and operatively connected with a driven shaft, a plurality of balls rotatably supported in said frame in engagement with the walls of said cylinder-chamber, a plurality of pairs of balls supported in said frame and engageable with the walls of said casing-chamber, said pairs of balls being arranged in radial, superposed relation, a driving-member journaled in said housing and slidably connected to a power-driven shaft and including a pair of cones in integral opposed relation disposed axially of said chambers, respectively, and slidable to selectively engage either of said sets of balls, means to resiliently engage said driving-member with the balls in said cylinder-chamber, and means to shift said driving-member to engage the balls in said casing-chamber.

2. Variable speed transmission apparatus, consisting in a housing, an annular bearing-strap rigidly mounted interiorly of said housing, a cylinder rotatably journaled in said bearing-strap having an interior, axially cylindrical chamber therein, a fixed casing mounted in axial alignment with said cylinder formed with an interior, axially cylindrical chamber oppositely disposed to said cylinder-chamber, a clutch device to prevent reverse rotation of the cylinder, a rotatable frame mounted in said chambers and operatively connected with a driven shaft, a plurality of balls rotatably supported in said frame in engagement with the wall of said cylinder-chamber, a plurality of pairs of balls rotatively supported in said frame within said casing-chamber, said pairs of balls being arranged in radial, superposed relation, a driving-member journaled in said housing and slidably connected to a power-driven shaft and including a pair of cones in integral opposed relation disposed in said chambers, respectively, and slidable to selectively engage either of said sets of balls, means to resiliently engage said driving-member with the balls within said cylinder, and means to shift said driving-member to engage said balls within the casing.

3. Variable speed transmission apparatus, consisting in a housing, a cylinder rotatably journaled in said housing having a circular chamber therein, a fixed casing mounted in axial alignment with said cylinder formed with a circular chamber oppositely disposed to said cylinder-chamber, means to prevent reverse rotation of said cylinder, a rotatable frame mounted in said chambers and operatively connected to a driven shaft, a plurality of balls rotatably supported in said frame in engagement with the wall of said cylinder-chamber, a plurality of pairs of balls rotatively supported in said frame within said casing-chamber, said pairs of balls being arranged in radial, superposed relation, a driving-member journaled in said housing and slidably connected to a power-driven shaft and including a pair of cones in integral opposed relation disposed in said chambers, respectively, and slidable to selectively engage either of said sets of balls, resilient means to engage said driving-member with the balls within said cylinder, and means to shift said driving-member to engage the balls within said casing.

4. Variable speed transmission apparatus, consisting in a housing, a cylinder rotatably journaled in said housing having a circular chamber therein, a fixed casing mounted in axial alignment with said cylinder formed with a circular chamber oppositely disposed to said cylinder-chamber, means to prevent reverse rotation of said cylinder, a frame rotatable in said chambers and operatively connected with a driven shaft, a plurality of balls rotatably supported in said frame in engagement with the wall of said cylinder-chamber, a plurality of pairs of balls rotatively supported in said frame within said casing-chamber, said pairs of balls being arranged in radial, superposed relation, a driving-member journaled in said housing and slidably connected to a power-driven shaft and including a pair of cones in integral opposed relation disposed in said chambers, respectively, and slidable to selectively engage either of said sets of balls, resilient means to engage said driving-member with the balls within said cylinder, and means to shift said driving-member to engage said balls within the casing.

5. Variable speed transmission apparatus, consisting in a housing, a cylinder rotatably journaled in said housing having a chamber therein, a casing mounted in axial alignment with said cylinder formed with a chamber oppositely disposed to said cylinder-chamber, a clutch device to prevent reverse rotation of said cylinder, a rotatable frame mounted in said chambers and operatively connected with a driven shaft, a plurality of balls rotatably supported in said frame in engagement with the wall of said cylinder-chamber, a plurality of balls rotatively supported in said frame within said casing-chamber, and a driving-member journaled in said housing and connected to a power-driven shaft and including a pair of cones in integral opposed relation disposed in said chambers, respectively, said driving-member being operative to selectively engage either of said sets of balls.

6. Variable speed transmission apparatus, consisting in a housing, a cylinder rotatably journaled in said housing having a cylindrical chamber therein, a casing mounted in axial alignment with said cylinder and formed with a cylindrical chamber, means to prevent reverse rotation of said cylinder, a rotatable frame mounted in said chambers and operatively connected with a drive shaft, a plurality of balls rotatably supported in said frame in engagement with the wall of said cylinder-chamber, a plurality of balls rotatively supported in said frame within said casing-chamber, a drivng member connected to a power-driven shaft and arranged to selectively engage either of said sets of balls, resilient means to engage said driving member with the balls within said cylinder, and means to shift said driving member to engage the balls within the casing.

7. Variable speed transmission apparatus, consisting in a housing, a cylinder rotatably journaled in said housing having a cylindrical chamber therein, means to prevent reverse rotation of the cylinder, a frame rotatable in said chamber and operatively connected with a driven shaft, a plurality of balls rotatably supported in said frame in engagement with the wall of said cylinder-chamber, a driving-member journaled in said housing and slidably connected to a power-driven shaft and including a cone disposed in said chamber, resilient means to slidably engage said driving-member with said balls, and means to shift said driving-member to disengage said balls.

8. Variable speed transmission apparatus, consisting in a housing, a cylinder rotatably journaled in said housing having a chamber therein, means to prevent reverse rotation of said cylinder, a frame rotatable in said chamber and operatively connected with a driven shaft, a plurality of balls rotatably supported in said frame in engagement with the wall of said cylinder-chamber, and a driving-member journaled in said housing and slidably connected to a power-driven shaft and including a cone disposed in said chamber.

9. Variable speed transmission apparatus, consisting in a housing, a cylinder rotatably journaled in said housing having a chamber therein, means to prevent reverse rotation of said cylinder, a frame rotatable in said chamber and operatively connected with a driven shaft, a plurality of balls rotatably supported in said frame in engagement with the wall of said cylinder-chamber, a driving-member journaled in said housing and slidably connected to a power-driven shaft and including a cone disposed in said chamber, and supplementary friction devices mounted upon said driving member and in engagement with said cylinder.

10. Variable speed transmission apparatus, consisting in a rotatably mounted cylinder having an interior circular chamber, a power-driven member rotatably mounted axially of said chamber, a frame rotatable between said cylinder and said member, a plurality of balls mounted in the frame and operatively engageable with the wall of the chamber and the member, and means to prevent the reverse rotation of said cylinder.

11. Variable speed transmission apparatus, consisting in a rotatably mounted cylinder having an interior circular chamber, a power-driven member rotatably mounted axially of said chamber, a frame rotatable between said cylinder and said member, a plurality of balls mounted in the frame and operatively engageable with the wall of the chamber and the member, supplementary friction devices mounted upon said power-driven member and in engagement with said cylinder, and means to prevent the reverse rotation of said cylinder.

12. Variable speed transmission apparatus, consisting in a rotatably mounted cylinder having an interior circular chamber, a power-driven member rotatably mounted axially of said chamber, a frame rotatable between said cylinder and said member, a plurality of balls mounted in the frame and operatively engageable with the wall of the chamber and the member, and frictional means mounted on said driving-member in engagement with said cylinder, and means to prevent the reverse rotation of the cylinder.

13. Variable speed transmission apparatus, consisting in a rotatably mounted cylinder having an interior circular chamber and including a plurality of cam-faces, a power-driven member rotatably mounted axially of said chamber, a frame rotatable between said cylinder and said member, a plurality of balls mounted in the frame and operatively engageable with the wall of the chamber and the member, frictional devices mounted on the driving-member bearing upon said cam-faces of the cylinder, and means to prevent the reverse rotation of the cylinder.

14. Variable speed transmission apparatus, consisting in a rotatably mounted cylinder having an interior circular chamber, a power-driven member rotatably mounted axially of said chamber, a frame rotatable between said cylinder and said member, a plurality of balls mounted in the frame and operatively engageable with the wall of the chamber and the member, means to prevent the reverse rotation of the cylinder, and devices mounted on said power-driven member and in frictional engagement with said cylinder.

15. Variable speed transmission apparatus, consisting in a rotatably mounted cylinder, having an interior circular chamber, a power-driven member rotatably mounted axially of said chamber, a frame rotatable between said cylinder and said member, a plurality of balls mounted in the frame and operatively engageable with the wall of the chamber and the member, means to prevent the reverse rotation of the cylinder, and frictional means mounted on said driving-member in engagement with said cylinder.

16. Variable speed transmission apparatus, consisting in a rotatably mounted cylinder having an interior circular chamber and including a plurality of cam-faces, a power-driven member rotatably mounted axially of said chamber, a frame rotatable beteween said cylinder and said member, a plurality of balls mounted in the frame and operatively engageable with the wall of the chamber and the member, frictional devices mounted on said power-driven member bearing upon said cam-faces of the cylinder, and means to prevent the reverse rotation of the cylinder.

ROBERT Z. FARMER.